June 11, 1963 H. R. UHTENWOLDT 3,093,225
MACHINE TOOL PRESELECT SPEED CHANGE MECHANISM
Filed July 5, 1960 2 Sheets-Sheet 1
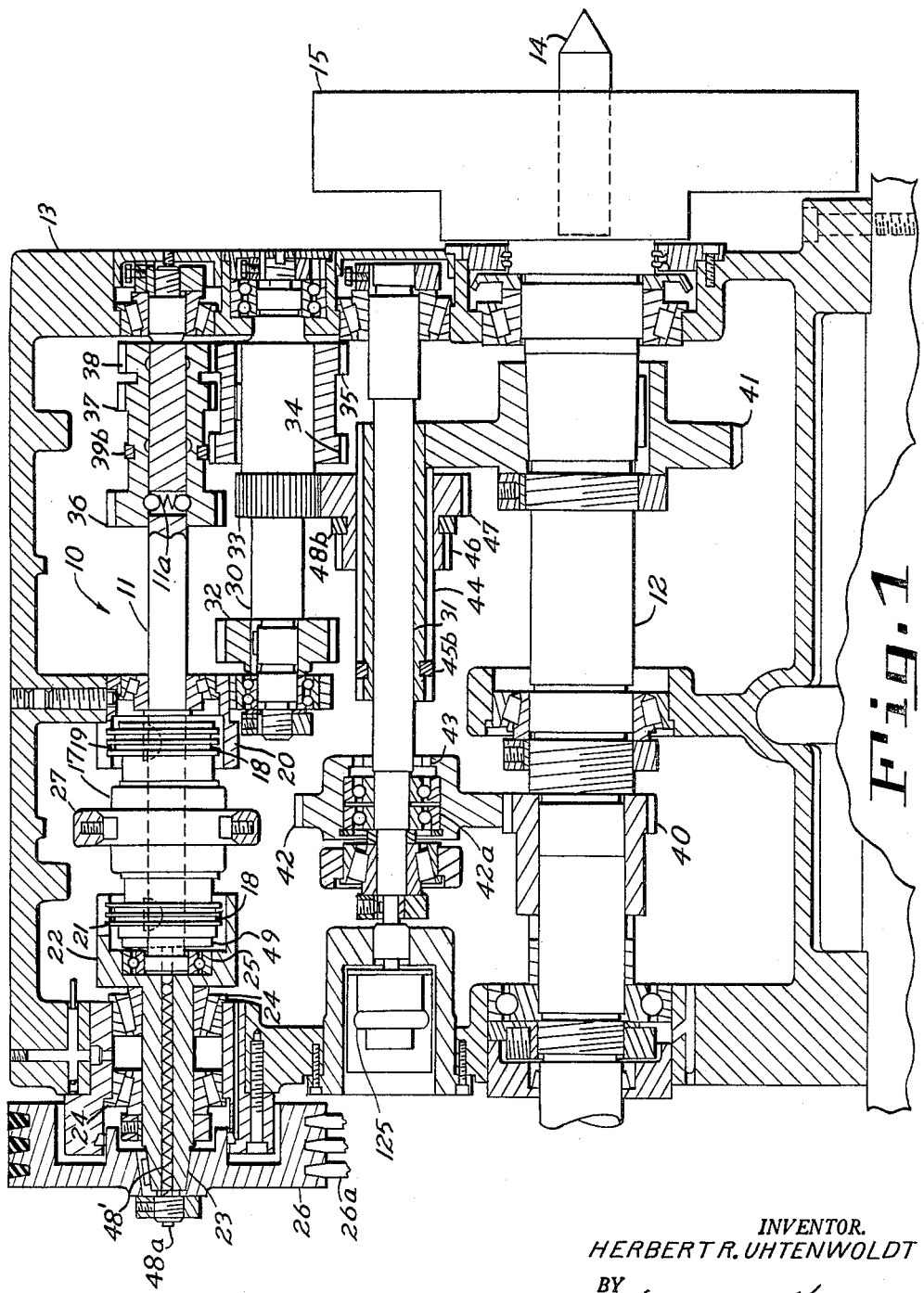
INVENTOR.
HERBERT R. UHTENWOLDT
BY
ATTORNEYS

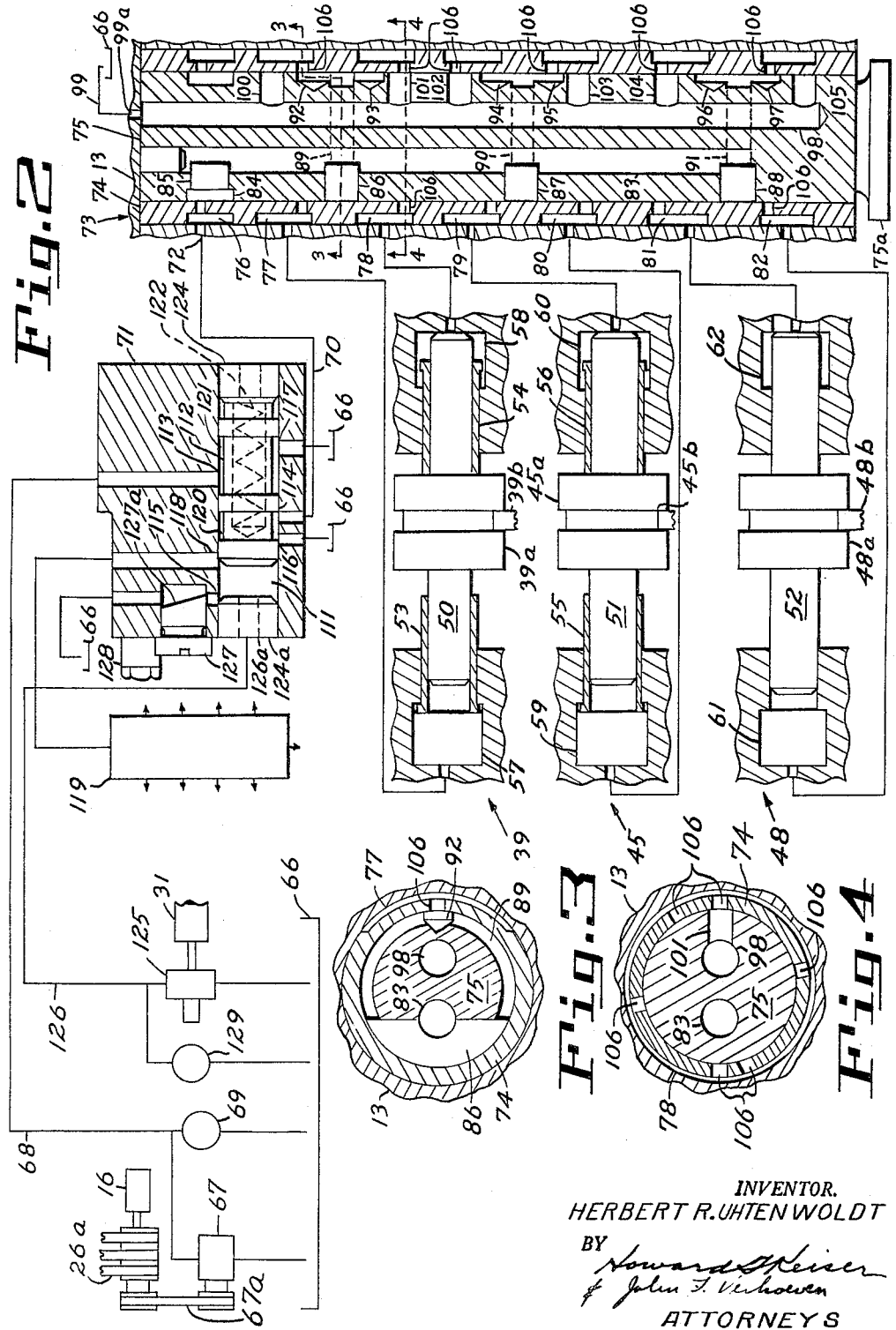

ున ited States Patent Office 3,093,225
Patented June 11, 1963

3,093,225
MACHINE TOOL PRESELECT SPEED CHANGE
MECHANISM
Herbert R. Uhtenwoldt, Wilmington, Ohio, assignor to The Cincinnati Milling Machine Company, Cincinnati, Ohio, a corporation of Ohio
Filed July 5, 1960, Ser. No. 40,892
7 Claims. (Cl. 192—4)

This invention relates to a speed change mechanism for a machine tool.

In a machine tool speed change mechanism such as a transmission through which a workpiece driving spindle or tool rotating spindle is driven, it is desirable, in order to save time in a work cycle requiring several different speeds of the workpiece or tool rotating spindle, that the operator be able to preselect the next speed at which the spindle is to be run before braking the spindle to effect the change. Moreover, minimum cycle time can be realized only if actuation of the gear shifting mechanism in the transmission is initiated at the earliest opportunity, without waiting for the transmission and spindle to come to a full stop.

In the present invention there is provided a mechanism which permits selection of the next desired speed of the spindle but which prevents shifting of the gears in the transmission until the driven shafts of the transmission which carry the gears have slowed down to a safe shifting speed, at which time actuation of the shiftable gears is begun without waiting for the shafts of the transmission to stop. In brief, this is accomplished by means of a pump operatively connected to one of the driven shafts of the transmission to produce an output corresponding to the speed of said shaft. This output, when it is above a predetermined level, disables the gear shifting mechanism so that preselection of the next desired spindle speed can be made by means of a selector valve without actuating the gear shifting mechanism while the shafts of the transmission and spindle are running at operating speeds. When the speeds of the spindle and transmission shafts drop, due, for example, to braking the gear shifting mechanism becomes effective automatically as soon as the output from the pump drops below said predetermined level which corresponds to the speed of said one driven shaft at which it is desired to initiate shifting. Thus regardless of the speed at which the spindle is initially running, and regardless of the effectiveness of the braking, shifting is begun only when the speeds of the shafts of the transmission are down to a safe shifting speed.

It is therefore an object of the present invention to provide a mechanism in which a spindle speed can be preselected and in which shifting is begun automatically before the spindle stops but not until the spindle has slowed to a speed at which it is safe to shift the gears of the transmission.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

FIG. 1 is a view of the spindle transmission in the headstock of a lathe embodying the present invention;

FIG. 2 is a schematic diagram of the portion of the hydraulic circuit of the machine of FIG. 1 pertaining to the mechanism of the present invention; and FIGS. 3 and 4 are views taken on the lines 3—3 and 4—4, respectively, of FIG. 2.

There is shown in FIG. 1 the transmission 10 of a machine tool having an input shaft 11 and an output shaft 12. In the illustrative embodiment of the invention described herein the transmission 10 is mounted in the headstock 13 of a lathe and the output shaft 12 is the headstock spindle which supports a workpiece on center 14 and drives the workpiece through dog plate 15. The input shaft 11 can be selectively engaged with a constant speed drive motor 16 (see FIG. 2), or, alternately, selectively braked to brake the spindle, through a double clutch mechanism operated through a hub 17 keyed to shaft 11. The shaft 11 has spaced plates 18 keyed thereto at both ends of hub 17, the plates at one end of the hub interleaved with plates 19 fastened in cup 20 which is secured in the headstock, and the plates at the opposite end interleaved with plates 21 fastened in cup 22 which is integral with a shaft 23 rotatably supported by bearings 24 in the headstock. The end of shaft 11 is rotatably supported in bearing 25 received in cup 22. The shaft 23 has a drive pulley 26 connected thereto, driven through belts 26a by motor 16, and when the hub 17 is shifted to the left by the manually operated forked lever 27 the shaft 11 is driven through pulley 26, shaft 23, cup 22 and locked plates 18—21, the plates 18—19 being loose at this time to permit relative rotation therebetween. When hub 17 is shifted to the right plates 18—21 are unlocked and plates 18—19 lock to stop rotation of shaft 11.

In addition to the input and output driven shafts 11 and 12 the transmission has intermediate driven shafts 30 and 31, all of the transmission shafts being rotatably supported in parallel relation in the headstock. All of the shafts have gears thereon and some of these gears are axially shiftable to provide selected combinations, or gear trains, between the input shaft and output shaft to drive the latter at selected speeds. The gears of the transmission are shifted to change from one spindle speed to another through the actuation of hydraulic shifters which selectively position the gears on the shaft to establish a selected gear train corresponding to the desired speed. The shaft 30 has the axially fixed gear 33 formed thereon, and the axially fixed gears 32, 34 and 35 keyed thereto. The input shaft has the gears 36, 37 and 38 keyed thereto and axially shiftable as a unit to one of three positions by hydraulic shifter 39 to engage one of the gears thereon with one of the gears on shaft 30 (36 with 32, or 37 with 34, or 38 with 35). Thus, the shaft 30 is continuously driven while the drive motor is connected to the input shaft.

The output shaft 12 has two axially fixed gears 40 and 41 keyed thereto, the gear 40 continuously engaged with a gear 42 rotatably mounted by bearings 42a, and axially fixed, on shaft 31 and having internal positive clutch teeth 43. The shaft 31 has two relatively shiftable gear members, an inner elongated gear member 44 (the left end of which defines a positive clutch element having external teeth adapted to mesh with clutch teeth 43) received on shaft 31 in nonrotatable relation thereto and shiftable into one of three positions by shifter 45, and an outer gear member comprising gears 46 and 47 received on member 44 in nonrotatable relation thereto and shiftable thereon between two positions by shifter 48. In either position of the outer gear member (and irrespective of the position of the inner gear member) the shaft 31 is connected to the shaft 30 (through gears 32—46 or gears 33—47) so that the shaft 31 is continuously rotated while the drive motor is connected to the input shaft. In the two extreme positions of the inner gear member 44 the shaft 31 is connected to the output shaft 12 (through 44—43—42—40 or through 44—41) but in the intermediate position of gear member 44 the output shaft is disconnected from shaft 31 and hence disconnected from the drive motor even when the drive motor is connected to the input shaft. Detent means, such as the balls and spring shown at 11a in shaft 11, may be used to hold the shiftable gears in their different positions until shifted therefrom by the shifters.

Means is provided to effect creep of shafts 11, 30, and 31, and hence the gears thereon, when the hub 17 is in the central neutral position to facilitate gear meshing when the drive motor is initially connected to the input shaft. A spring 48' is received in a central bore of shaft 23 and operates to urge a pin 49, extending through a slot in shaft 11, into engagement with the sets of plates 18—21. A set screw 48a adjusts the compression of spring 48' so that sufficient torque is transmitted through the plates to slowly rotate the shafts 11, 30, and 31 and the gears thereon.

As shown in FIG. 2 the shifters 39, 45 and 48 have hydraulic motors, each comprising a pair of spaced cylinders in communication with a piston therebetween, pistons 50, 51 and 52 of the motors connected, respectively, to the shiftable gear members through shifter members 39a, 45a, and 48a secured on the pistons and forked arms 39b, 45b, and 48b engaged in said shifter members. The pistons 50 and 51 are received in sleeves 53, 54 and 55, 56 on each side of the shifter members 39a and 45a, and the outer ends of the sleeves are received in cylinders 57, 58, 59, 60. The outer ends of the sleeves have flanges which stop their movement when they reach the inner end of the cylinder and the inner ends of the sleeves are adapted to engage the shifter members 39a, 45a. Thus, when pressure is introduced to one cylinder of one of these shifters 39 or 45, and the other cylinder of that shifter is connected to discharge, one end of the piston abuts against the far end of the cylinder connected to discharge to hold the gears to which the fork is attached in one extreme position. However, when both cylinders of one of these shifters are connected to pressure, the flanges of both sleeves are urged to the inner end of the cylinders and the inner end of both sleeves engage the shifter to position the shifter, including the piston thereof, in a center position, or intermediate, position to hold the gear member to which the shifter is attached in a center, or intermediate, position. Shifter 48 has cylinders 61 and 62 to receive the ends of piston 52 and the shifter member 48a, which is secured to the piston and engaged with the forked arm 48b, is shifted between two positions by introduction of pressure to one cylinder and connection of the other cylinder to discharge. Thus, the pressure conditions at the shifters, or, more specifically, the pressure conditions at the sides of the shifters, defined by the cylinders of the hydraulic motors, will determine the position of the shiftable gears, and hence the speed at which the output shaft, or spindle, 12 is driven.

The pressure condition at the shifters is determined by a hydraulic speed selector circuit connected between a source of fluid under pressure and the shifters. The source of fluid under pressure comprises a sump 66, and a pump 67 driven through belt 67a by motor 16 to take fluid from the sump and deliver it under pressure to a pressure line 68, a pressure relief valve 69 being connected to line 68 and discharging to the sump to establish the pressure in line 68. The pressure line 68 is connectable to an operating line 70 through a control valve 71. Operating line 70 is connected to operating port 72 of a selector valve indicated generally at 73. The valve 73 comprises a sleeve 74 fixed in a casing or housing which may, for example, be the headstock housing 13, and a rotatable core 75 received within the sleeve 74. The core 75 has a knob 75a connected thereto which rotates the core into a selected angular position corresponding to the desired speed of the transmission output shaft. The sleeve 74 has a plurality of external annular grooves 76, 77, 78, 79, 80, 81 and 82, the groove 76 communicating with operating port 72 and the other grooves communicating, respectively, with motor ports in headstock 13 connected, respectively, to cylinders 57, 58, 60, 59, 62 and 61. The core 75 has an elongated passage 83 connected in any selected rotary position of the core to external groove 76 (and hence to operating port 72) through external annular groove 84 on the core and passage 85 connecting that groove to passage 83. The core is cut away at 86, 87, and 88 so that passage 83 connects to external grooves 89, 90, and 91 on the core, and hence the passage 83 is at all times in communication with the pairs of spaced core pressure ports 92—93, 94—95, 96—97 which connect with grooves 89, 90, 91, respectively. The core has a second elongated passage 98 extending therethrough parallel to passage 83 which at one end is connected to sump 66 through discharge line 99 and discharge port 99a of the selector valve. The passage 98 is connected along its length to core discharge ports 100, 101, 102, 103, 104 and 105. Each of the external sleeve annular grooves 77, 78, 79, 80, 81 and 82 (each of which is connected to one of the cylinders) is in registration with one core pressure port (connected to the selector valve operating port 72) and one core discharge port (connected to the selector valve discharge port). The sleeve 74 has circumferentially arrayed holes 106 which in any angular position of the core 75 connects each groove (77, 78, 79, 80, 81, 82) to either a core pressure port (92, 93, 94, 95, 96, 97) or a core discharge port (100, 101, 102, 103, 104, 105) so that in any given angular position of the core each hydraulic cylinder is selectively connected to operating port 72 or discharge port 99a. For example, with the core 75 in the angular position shown in FIG. 2, the side of the shifter 39 defined by cylinder 57 is connected to the operating port 72 (and hence to pressure if there is pressure in the operating line) through annular sleeve groove 77, hole 106, core pressure port 92, core external groove 89, recess 86, passage 83, passage 85, core external groove 84, and sleeve external groove 76 which is connected to the operating port 72. The other side of shifter 39, cylinder 58, is connected to discharge through external annular sleeve groove 78, hole 106, core discharge passage 101, passage 98, discharge port 99a, and return line 99. Cylinders 59 and 61 of shifters 45 and 48 are connected to pressure and cylinders 60 and 62 of these shifters are connected to exhaust by paths through the selector valve similar to those described for shifter 39. The holes 106 in the valve sleeve 74 are so positioned that in certain angular positions of the core both end cylinders of shifters 39 and 45 are connected to pressure so that these shifters are held in their intermediate positions. When the shifter 45 is held in its intermediate position the output shaft 12 of the transmission is disconnected from shaft 31 so that shaft 12 is not driven even though the input shaft may be connected to the drive motor.

When the selector valve is operated by rotation of knob 75a to rotate core 75, a different combination of cylinders will be connected to the operating port 72 and the discharge port 99a of the selector valve 73. Thus the selector valve conditions the shifters for actuation in response to the pressure condition at operating port 72 since the port 99a is continuously connected to discharge. Despite operation of selector valve 73 the shifters will not be actuated unless pressure is applied at port 72. Therefore, when pressure is removed from operating port 72 the hydraulic speed selector circuit comprising pressure line 68, control valve 71, operating line 70, selector valve 73, and return line 99 is ineffective to actuate, or operate, the shifters and the next desired speed of the output shaft can be preselected by rotation of core 75 while the output spindle shaft is running. When pressure is subsequently supplied to port 72 the speed selector circuit becomes effective to shift the shifters to the positions predetermined by the selector valve.

Control valve 71 controls the pressure condition at operating port 72 and therefore operation of valve 71 will determine the effectiveness of the speed selector circuit to actuate the shifters. The control valve 71 has a bore 111 with a slidable plunger 112 therein. The valve has a port 113 connected to the pressure line 68 and a control valve operating port 114 connected to the operating line 70. The bore 111 has communicating therewith three discharge ports 115, 116 and 117, and a port 118 connected to an oil distributor 119 which operates to lubricate the transmission. The plunger has three spaced lands which define two annular passages 120, 121 and receives a spring 122, one end of which abuts against fixed plug 124 at one end of the bore normally to bias the plunger to the left to abut against the fixed plug 124a in the opposite end of the bore. When the plunger is in its normal biased position against plug 124a, the pressure line 68 is connected to the operating line 70 through port 113, passage 121, and control valve operating port 114 to connect selector valve operating port 72 to pressure, and the speed selector circuit 65 is effective to operate the shifters (if they are not already in positions corresponding to the position of the selector valve), and thereby effect a speed change in the transmission. When the movable control valve member 112 is moved to the right against the bias of the spring, pressure line 68 is connected to discharge through port 113, passage 121, and discharge port 117. With the plunger to the right, operating line 70 is also connected to discharge through port 114, passage 120, and port 116 to remove pressure from selector valve operating port 72 and render the speed selector circuit ineffective to operate the shifters, regardless of any change in the angular positioning of core 75.

The control valve 71 is operated in response to the speed of shaft 31 of the transmission so that the speed selector hydraulic circuit is rendered ineffective to operate the shifters wherever the speeds of the transmission shafts are above a speed at which it is desired that shifting begin, and, conversely, the speed selector circuit is rendered effective to initiate operation of the shifters when the speeds of the transmission shafts have dropped to a safe shifting speed.

The control valve 71 is operated by means of a hydraulic pump 125 connected to shaft 31 of the transmission. This pump pumps oil from sump 66 into line 126 at an output corresponding to the speed of shaft 31, the relief valve 129 connected to line 126 and discharging to the sump establishing the maximum pressure in line 126. Line 126 is connected to the pump port 126a in plug 124a adjacent discharge port 115 which is located at the same end of the bore as plug 124a. A pin 127 with a beveled end 127a releasably clamped in a predetermined angular position by clamping screw 128 provides an adjustable restriction for discharge port 115. When the volume of oil discharge from pump 125 and entering bore 111 from line 126 is in excess of the volume of oil discharged through port 115, plunger 112 is urged to the right to connect the operating port 114 of control valve 71, which port is connected to operating port 72 of the selector valve, to discharge and render the shifters inoperative. Thus for any given setting of pin 127, the valve 71 will be operated (by the shifting, or actuation, of valve member 112 to the right from its normal position) to render the shifters inoperative when the pressure output from pump 125, determined by the speed of shaft 31, produces a force on member 112 exceeding the biasing force produced by spring 122. Adjustment of pin 127, to permit more or less discharge from bore 111 and thereby change the pressure in bore 111 resulting from the output of pump 125 for any given speed of the pump, will determine the speed of shaft 31 required to operate the valve 71 and render the shifters inoperative.

The pump 125 may be operatively connected to any of the shafts of the transmission but, where one or more of the shafts, such as shaft 12, is disconnected from the input shaft at a particular setting of the selector valve, it is preferable that the pump be connected to a shaft which runs continuously when the input shaft is engaged with the drive motor. With this construction the control valve 71 retains control over the hydraulic speed selector circuit whenever any shaft of the transmission is running. In the lathe headstock transmission the range of spindle operating speeds extends above and below the driven speed of the input shaft. Under these conditions, it is desirable that the pump be connected to an intermediate shaft, such as 31, so that the speed of the intermediate shaft, rather than the input or output shaft, controls the operation of valve 71 to commence actuation of the shifters. The speed ratio between one shaft and any other shaft in the transmission will depend on the particular combination of gears connecting the shafts and therefore, for any given speed of one shaft there will be a range of speeds for any other shaft depending on which of the many possible gear combinations connect the two shafts. If the pump is connected to the one shaft, the control valve should be set so that the gears can begin shifting without clashing under the worst condition, that is when the speed ratio between the shafts is the greatest and the speed of the fastest shaft is at a maximum shifting speed. Thus, in some gear combinations all shafts will be slowed down below the maximum shifting speed before shifting begins. The range of possible speed ratios between an intermediate shaft, such as 31, and either extreme shaft 11 and 12, is less than the range between shafts 11 and 12, so that when the initiation of gear shifting is controlled by shaft 31, instead of, for example, shaft 11, shifting will begin, on the average, more closely to a desired maximum shifting speed. It should be noted that regardless of the transmission shaft to which the pump is connected, the speed thereof at which shifting begins (established by adjustment of valve 71) must be below the minimum operating speed of that shaft when the transmission is connected to the drive motor so that the speed selector circuit is not rendered effective to actuate the shifters while the transmission is being driven at its minimum operating speed.

With the lever 27 in the center neutral position, motor 16 is started and, since shaft 31 is not driven and pump 125 is therefore not operating, control valve 71 will be in its normal unoperated condition. Pressure from line 68 will therefore be applied through line 70 to operating port 72 and the shifters will be actuated, if not already in the positions corresponding to the angular position of the core of selector valve 73, to shift the transmission gears. When lever 27 is shifted to the left (as viewed in FIG. 1) the spindle 12 will be driven at the selected speed and control valve 71 will be operated to change the pressure condition at operating port 72, by cutting off pressure therefrom and connecting said port to discharge, to render the shifters inoperable. With the spindle running at the selected speed, the selector valve 75 may be operated to preselect the next desired speed of output shaft 12. Since operating port 72 is connected to discharge both sides of all shifters are connected to discharge through the selector valve, and operation of the selector valve, which changes the combination of cylinders connected to port 72 and port 99a, will not effect actuation of the shifters but will condition them for actuation when pressure is restored to operating port 72. This occurs when the lever 27 is shifted to the right to brake the spindle. As soon as shaft 31 slows down to a speed at which the output pressure of pump 125 is insufficient to hold control valve member 112 in the right hand position, the valve member is shifted to the left by spring 122 to reconnect operating line 70 to pressure line 68. When this occurs the shifters are actuated to shift the gears and the lever 27 may immediately be shifted to the left to reconnect the transmission to the drive motor.

What is claimed is:

1. In a machine tool having a transmission with a driven shaft and a plurality of shiftable speed change gears to drive a spindle at selected operating speeds, the transmission having shifters operable when actuated to shift the transmission gears and change the speed of the spindle, the improvement comprising a pump operatively connected to said shaft to produce an output varying as the speed of said shaft varies, means operable in response to the output from said pump to render the shifters inoperable when said shaft is driven above a predetermined speed and to render said shifters operable when said shaft slows down to a speed below said predetermined speed, and means to condition the shifters while inoperable for subsequent actuation when operable.

2. In a machine tool having a transmission with a plurality of driven shafts and a plurality of shiftable speed change gears to drive a spindle at selected speeds, the transmission having hydraulic shifters to effect when operated a shift of gears to change the speed of the spindle, the machine tool having a source of fluid under pressure, the improvement comprising a hydraulic circuit connected to the source of fluid under pressure and shifters, said circuit including a control valve having a movable valve member biased to a first position, said valve operable when said valve member is in said first position to effect operation of said shifters, said valve member movable to a second position to render said shifters inoperable, a hydraulic pump connected to one of said driven shafts of the transmission operable to produce a pressure output varying as the speed of said one driven shaft of the transmission varies, and means connecting the pressure output of said pump to the control valve to move said valve member to said second position when the pump is producing a pressure output above a predetermined level.

3. In a machine tool a source of fluid under pressure, a drive motor, a transmission having a plurality of driven shafts including an input shaft selectively connectable to the drive motor and an output shaft, said transmission having a plurality of gears to connect the output shaft to the input shaft, said transmission having a plurality of hydraulic shifters connected, respectively, to some of said gears and actuable to position said gears in response to pressure conditions at said shifters, a speed selector hydraulic circuit connected to said shifters and said source of fluid under pressure, said circuit including a selector valve to selectively connect said shifters to said circuit and to change the connection of said shifters to the circuit on operation of the valve to condition at least some of said shifters for actuation, a pump connected to one of the driven shafts of said transmission to produce a pressure output varying in accordance with the speed of said one shaft, and valve means in said speed selector circuit responsive to the pressure from said pump to render the speed selector circuit effective to actuate the shifters conditioned by operation of the selector valve when the pump pressure drops below a predetermined value.

4. In a machine tool having a drive motor and a transmission with a driven shaft and a plurality of shiftable speed change gears to drive a spindle at selected speeds, the transmission having hydraulic shifters to effect when actuated a shift of gears to change the speed of the spindle, the machine tool having a source of fluid under pressure, the improvement comprising a control valve connected to the source of pressure having a movable valve member operable in one position to connect the source of pressure to an operating port therein, said valve member operable when moved to a second position to connect said operating port to discharge, means selectively to connect said shifters to the control valve operating port for actuation of the shifters when said port is connected to the source of pressure, a hydraulic pump connected to said shaft to produce a rate of fluid discharge from the pump increasing as the speed of said shaft increases, and means connecting the pump to the control valve to move said valve member to said second position in response to a predetermined discharge rate from the pump.

5. In a machine tool having a transmission with a driven shaft and a plurality of speed change gears shiftable into a plurality of combinations to drive a spindle at a plurality of selected speeds, said transmission having a plurality of shifters with hydraulic motors actuable to effect shifting of the transmission gears, the combination comprising a selector valve having a plurality of motor ports connected to the shifter motors and an operating port, said valve having a selectively positionable valve member operable to connect selected motor ports to the operating port to condition the shifters for actuation in response to the pressure condition at the operating port, hydraulic circuit means to control the pressure condition at the operating port of the selector valve, said means including a control valve connected to the operating port of the selector valve normally set to produce an operating pressure condition at the operating port of the selector valve for actuation of the shifters in accordance with the positioning of the selector valve member, said circuit means producing a pressure condition at the operating port ineffective to actuate the shifters when the control valve is operated, a hydraulic pump operatively connected to said shaft having a pressure output varying as the speed of said shaft varies, and means connecting the output of said pump to the control valve to operate said valve when said pressure output is above a predetermined level.

6. In a machine tool a source of fluid under pressure, a constant speed drive motor, a transmission having a plurality of shafts including an input shaft and an output shaft and having hydraulic shifters, said shifters having hydraulic motors and operable in response to hydraulic fluid under pressure selectively supplied to the sides of the hydraulic motors to connect the output shaft to the input shaft for rotation at selected operating speeds, means selectively to connect the transmission input shaft to the drive motor, means selectively to brake one of the shafts of the transmission, a selector valve having an operating port and a discharge port and having ports connected to the sides of said motors, said selector valve selectively positionable to connect selected sides of said motors to the operating port and discharge port, a hydraulic pump connected to one of said transmission shafts for operation thereby when the transmission is connected to the drive motor to produce a fluid output at a rate corresponding to the speed of said one transmission shaft, and a control valve connected to the source of pressure and the operating port of the selector valve and having a valve plunger normally biased to a first position to connect the source of fluid under pressure to the operating port of the selector valve, the output of said pump in communication with said plunger to shift the plunger against said bias to a second position to block the source of fluid from the operating port of the selector valve and connect said operating port to discharge when said one transmission shaft is running above a predetermined speed below its running speed when the output shaft is running at its minimum operating speed.

7. In a machine tool a source of fluid under pressure, a constant speed drive motor, a plurality of shafts including an input shaft, an output shaft, and an intermediate shaft, said shafts having a plurality of gears mounted thereon, at least some of said gears being axially shiftable on the shafts, a clutch operable when engaged to connect the input shaft to the drive motor, a plurality of movable shifters operatively connected to the axially shiftable gears for axial positioning thereof, each of said shifters having a hydraulic motor for movement thereof, said shifters positioned in response to selected pressure conditions at the sides of the hydraulic motors to position the shiftable gears and connect some of said shafts including the input shaft to the input shaft through the gears for driving of said shafts by the drive motor and driving said output shaft at selected operating speeds when said clutch is engaged, said shifters positioned in response to a predetermined pressure condition at the sides of the hydraulic motors to disconnect at least the output shaft from the input shaft, means selectively to brake the output shaft when the output shaft is connected to the input shaft and said clutch is disengaged, a selector valve having an operating port and a discharge port and having motor ports connected to the sides of said hydraulic motors, said selector valve selectively positionable to connect selected motor ports through the valve to the operating port and the discharge port thereof to produce selected pressure conditions at the sides of the hydraulic motors when the operating port is connected to the source of pressure and to render said shifters inoperable when the operating port is connected to discharge, a hydraulic pump connected to said intermediate shaft to discharge fluid at an output rate in accordance with the speed said intermediate transmission shaft is driven by the drive motor, a control valve connected to the source of pressure and the operating port of the selector valve, said valve having a bore and a plunger slidably received therein, said bore having a pump port at one end connected to said pump to receive fluid discharged therefrom and having a discharge port at said one end, said plunger normally biased toward said one end of the bore to connect the source of pressure to the operating port of the selector valve, said plunger moved toward the opposite end of the bore to disconnect the source of pressure from the operating port of the selector valve and connect said operating port to discharge when fluid is received in said bore from the pump port at a rate greater than the rate fluid is discharged from said control valve discharge port, and means to restrict the flow from said discharge port of the control valve to a rate below the output rate of discharge from the pump produced by rotation of said intermediate shaft when said intermediate shaft and the output shaft are driven by the drive motor and the output shaft is running at its minimum operating speed.

References Cited in the file of this patent

UNITED STATES PATENTS

| | | |
|---|---|---|
| 2,782,651 | Sassen et al. | Feb. 26, 1957 |
| 2,782,891 | Sassen | Feb. 26, 1957 |
| 2,856,044 | Koenig et al. | Oct. 14, 1958 |
| 2,915,910 | Dickas | Dec. 8, 1959 |
| 2,933,936 | McClelland | Apr. 26, 1960 |